Patented Nov. 1, 1938

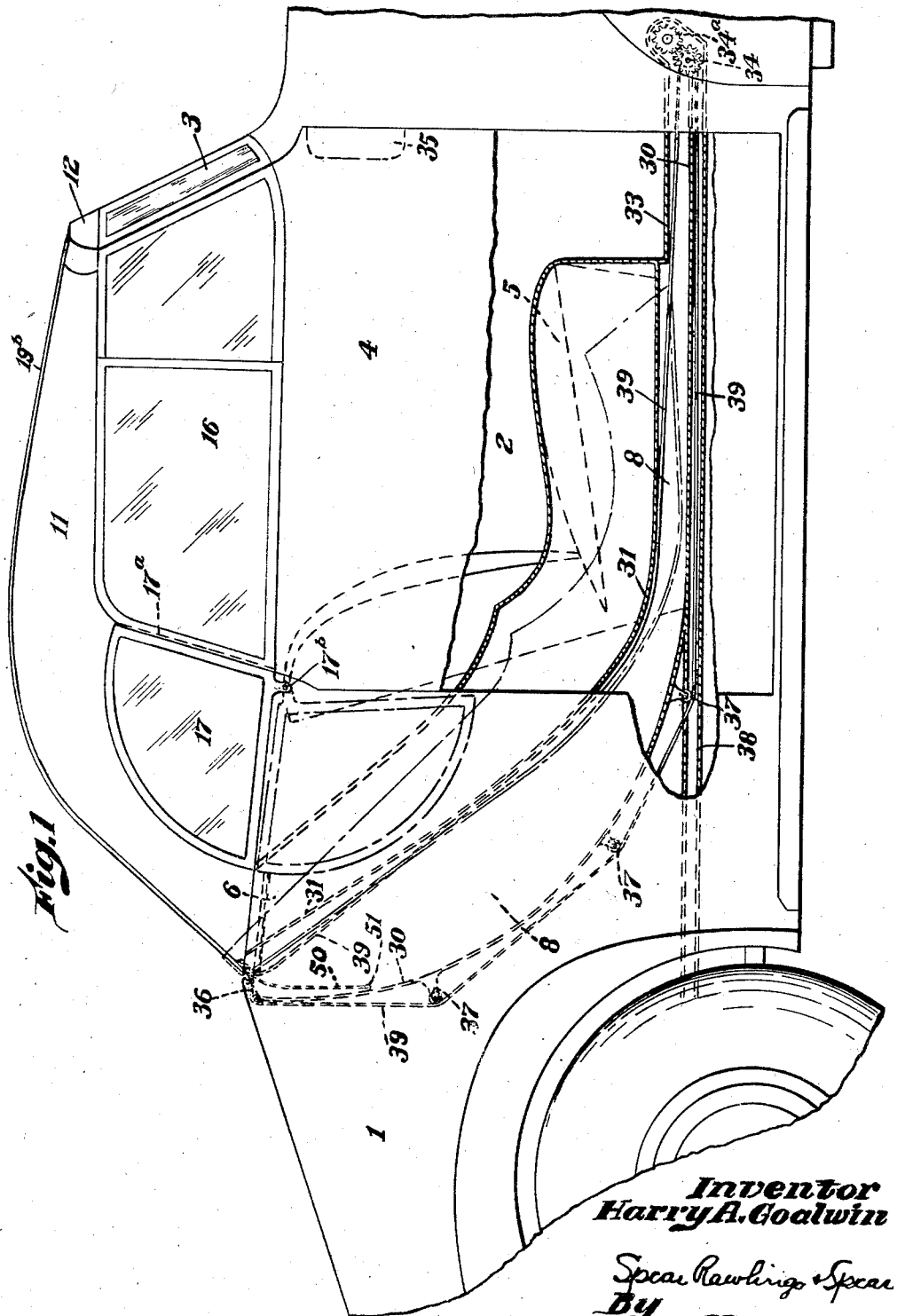

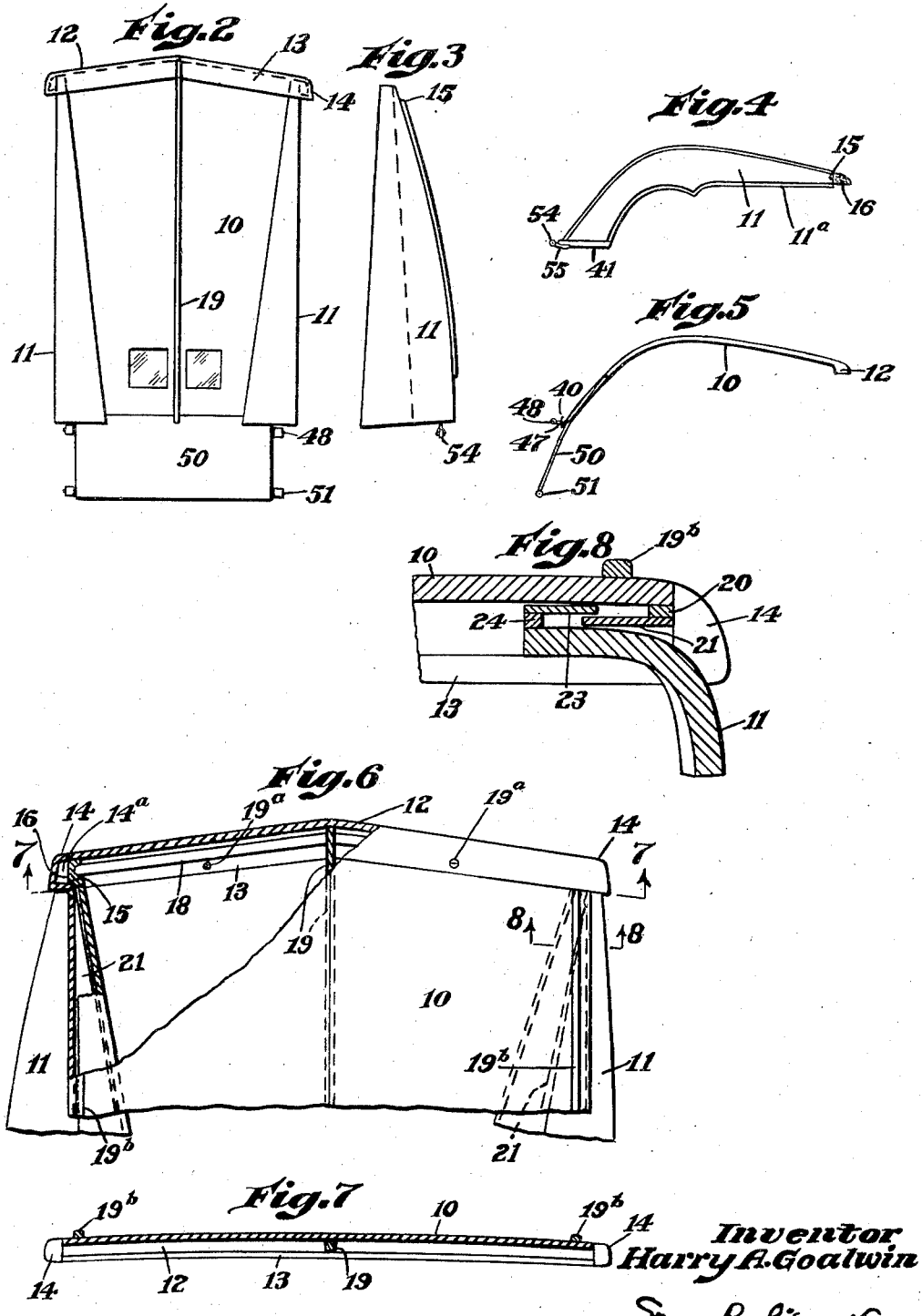

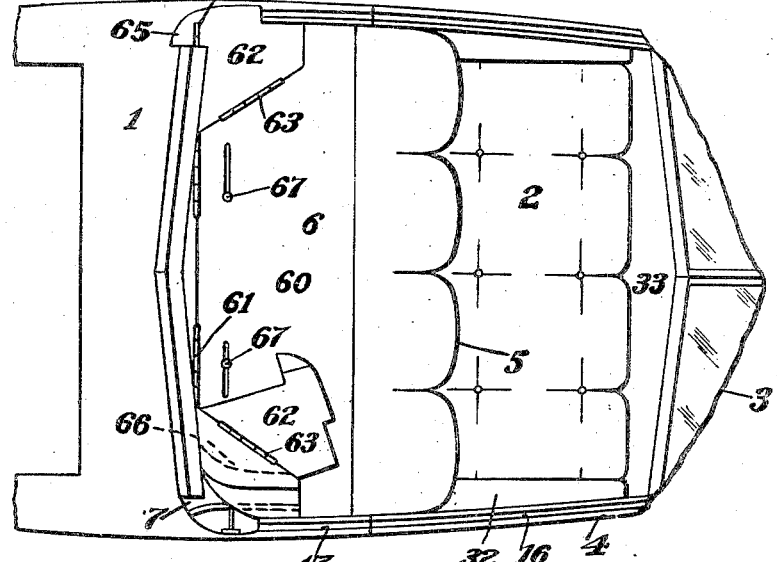
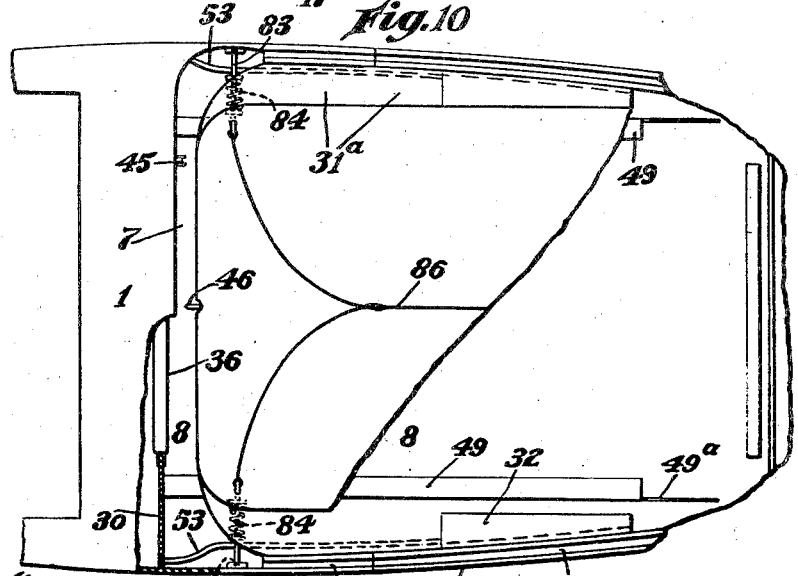
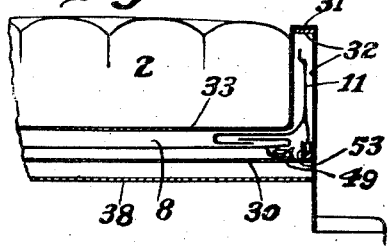

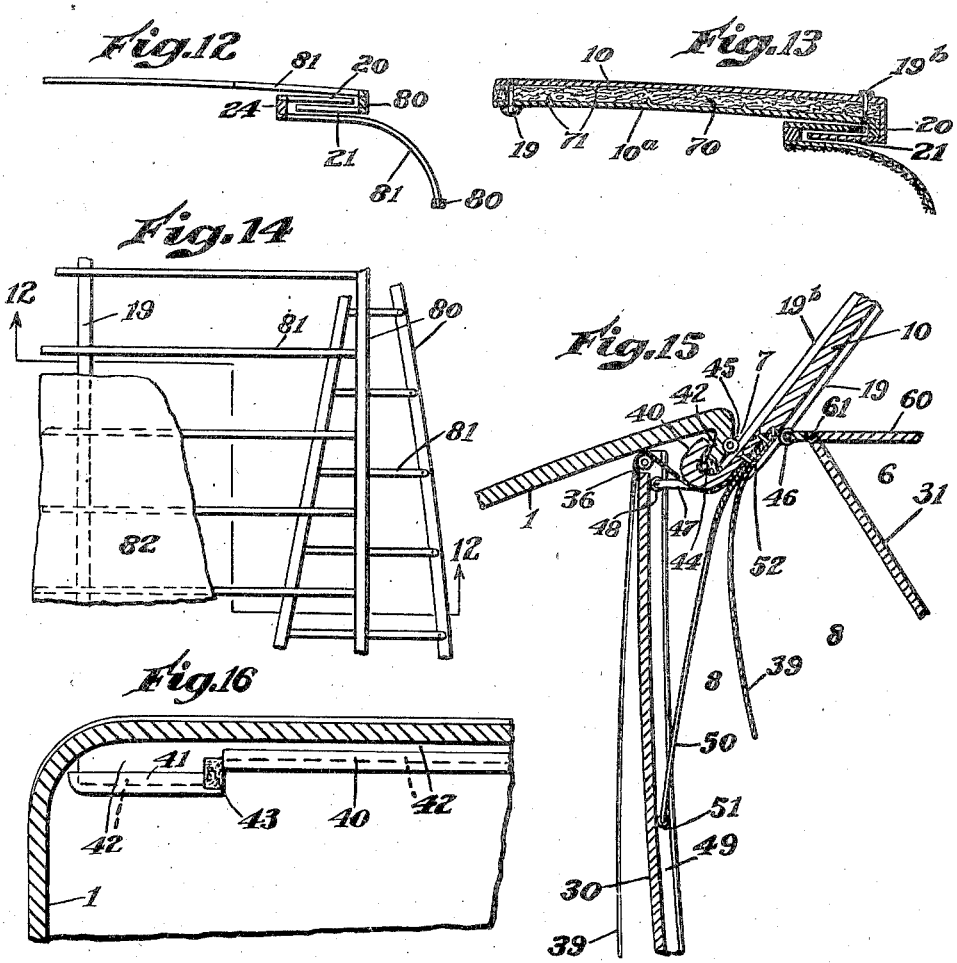

2,134,784

UNITED STATES PATENT OFFICE 2,134,784

AUTOMOBILE BODY CONSTRUCTION

Harry A. Goalwin, Togus, Maine

Application March 13, 1937, Serial No. 130,709

12 Claims. (Cl. 296—107)

My present invention relates to a novel body and top construction in which the advantages of open and closed automobile body types may be fully combined.

As a result of the general preference for closed bodies and the resulting development of the automobile, the open car is now popularly represented principally by the so-called convertible body styles which offer selectively some of the advantages of each type. These convertible styles have followed generally the construction of the closed types in that windows have been provided so that when the foldable top is raised, a closed car is approximated, while with the top down and the windows lowered, the full advantages of an open car are available. In these convertibles, however, certain faults exist which though widely recognized may be mentioned.

These faults relate for the most part to the type of top which has been customarily used. These tops consist of a foldable frame work covered with a fabric. Such tops, although now improved to permit compact folding, are inherently difficult to raise and lower, the fabric is of relatively short life, and the structure permits neither the insulation nor reinforcement necessary to afford adequate protection in case of accident.

These difficulties have been recognized and it has been proposed to use tops of metal. Some of these proposals have contemplated a storage chamber for the top within the vehicle body and the use of means to carry the top from its stored position to that of use or vice versa. These proposals were themselves objectionable for several reasons, the most serious of which are that the tops proposed impose serious restrictions on the utility of the top and detract from the style and appearance of both top and body.

One additional objectionable feature inherent in the present foldable top construction and meriting separate discussion is that such tops include only a rear window limiting, particularly in coupés, the driver's vision by the dangerous "blind" zones between the rear window and the windows in the doors. The blind zones can not be eliminated with folding tops so long as the advantages of closed cars are desired for the folding frame work, which supports the fabric, includes ribs pivoted to the car body sufficiently near to the doors to permit one rib to serve as a post which protrudes into the space over the door sufficiently so that the door windows when raised will be sufficiently close thereto to protect the passengers against the weather.

In accordance with my invention, I propose to use a top preferably of metal which may be stored within the body and which is so constructed that style and design are not interfered with, while the same complete protection for passengers that is present in closed cars is afforded. I am able to accomplish this by providing a top which is composed of a center portion to which side portions are pivotally connected at their front ends for movement relative to the center portion, means controlling such movement, and means for positioning the top including both center and side portions within a storage chamber which being within the car body is of less width than that of the area to be covered when the top is erected.

As the top, in accordance with my invention, does not fold with the result that the ribs of the present construction are eliminated, the blind zones to which I have referred may be eliminated and windows provided.

Other advantages of my invention will be obvious as the full description of my invention is developed. In the drawings, I have illustrated my invention as embodied in a coupé-type of body, and where possible I have shown views indicating typical problems and their solution.

In the drawings:

Fig. 1 is a fragmentary side view of an automobile embodying my invention.

Fig. 2 shows a development of the inner surface of the center top panel.

Fig. 3 is a similar view of one of the top side panels.

Fig. 4 is a side view of the side panel shown in Fig. 3.

Fig. 5 shows the central panel in side view.

Fig. 6 shows a fragmentary view of the assembled top.

Fig. 7 is a view of the front portion of the center panel as viewed along the lines 7—7 of Fig. 6.

Fig. 8 is an enlarged section through the top along the lines 8—8 of Fig. 6.

Fig. 9 is a fragmentary plan view of a passenger compartment.

Fig. 10 is a similar view showing the storage chamber.

Fig. 11 is an illustrative fragmentary view of a section taken through the compartment and storage chamber.

Fig. 12 is a fragmentary view of a modified top construction.

Fig. 13 is a fragmentary illustration of another modification of top construction.

Fig. 14 is a fragmentary plan view of the form of top shown in Fig. 12.

Fig. 15 shows an enlarged fragmentary view of the center panel in raised position showing the guide means, and Fig. 16 is a fragmentary view showing the position of the sections of the top when raised in relation to the flanges which cooperate in sealing the storage chamber against the entrance of moisture.

At 1 I have indicated an automobile body having a passenger compartment 2 defined by the V-shaped windshield 3, the sides of the body 1, the doors 4, and by the U-shaped entrance 7 to the top storage chamber 8, through the upper surface of the body 1, and positioned rearwardly of the seat 5 and the box 6.

Within the body 1, I provide the storage chamber 8 which is adapted to receive the top in inverted position as indicated in Fig. 1. As the details of the chamber 8 are in part dependent on the characteristics of the top, I shall describe my novel top construction prior to an explanation of the chamber 8, although calling attention at this time to the fact that due to the semi-boat shape of automobile bodies, the forward part of the chamber 8 is invariably of less width than the rear portion of the passenger compartment 2 and the upper part of the body is wider than the corresponding floor width.

The top which is preferably of metal includes a center panel 10 of substantially flat cross section, and side panels 11 which are formed with reference to the shape of the passenger compartment 2. In Fig. 1, I have shown the windows 16 and 17 in the door 4 and body 1, respectively. The lower edges of the side panels 11 are rabbeted as at 11ᵃ (Fig. 4) to receive the upper edges of the frames for the windows 16 and 17 while the frame of the window 17 includes a flange 17ᵃ against which the adjacent frame of the window 16 is adapted to bear to close the passenger compartment 2 more completely.

The center panel 10 has parallel sides, and at its forward end is formed to present a head 12, the bottom wall 13 of which is shaped to bear against the windshield 3 to which it may be secured in any desired manner. The windshield 3 is wider than the panel 10 and for that reason the head 12 projects laterally thereof (Fig. 1) as at 14, which lateral projections are formed as pockets 14ᵃ.

The side panels 11 of the top present the outward curve required by the body shape, and for that reason it is essential that these side panels be pivoted at their front ends for lateral movement relative to the top panel 10 in order that the side panels may be swung inwardly to the predetermined limited extent necessary for the purpose of storage of the top within the chamber 8.

To effect this adjustment, the side panels 11 are flanged as at 15 to provide heads 16 adapted to enter the head 12 with the flanges 15 bearing against the outer edges of the pockets 14ᵃ. While the heads 16 may be pivoted with relation to the center panel 10 as desired, I have shown in Fig. 6 the heads 16 receiving the pivot bar 18 which is held against the center rib 19 as by locking screws 19ᵃ. Ribs 19ᵇ are positioned on the outer surface of the panel 10 adjacent its edges.

The longitudinal interlock permissive of limited lateral pivoting of the side member 11 relative to the center panel 10, also serves to maintain a tight seal between the side panels 11 and center panel 10. On the inner surface of the center panel 10 along the edge thereof are secured thin bars 20 to which are welded spring metal plate members 21 defining with the panel 10 recesses to receive a like spring metal member 23 on a bar 24 on each of the inner edges of the sides 11. The spring metal members 21 and 23 are relatively narrow at their fronts and increase in width rearwardly (Fig. 6) to permit the side panels 11 to be moved laterally outwardly into position to cover the passenger compartment 2, and to receive the tops of the windows 16 and 17 against their flanges or rabbeted edges 11ᵃ, and to maintain the interlock during the limited lateral inward pivoting of the side panels 11 relative to the top panel 10 necessary to adapt the top for storage. This may be fully understood from a comparison of the left and right hand sides of Fig. 6. That is, when the outer edges of the members 23 are parallel to the sides of the center panel 10, the top is adapted to cover the passenger compartment 2, while the inner edges of the members 21 define the inner limits of the arc through which the sides 11 may be pivoted and the interlock maintained. The members 21 and 23 are similarly shaped in order to facilitate the assembly of the top and to insure a tight interlock.

In Figs. 1, 9, 10, 11, 15, and 16, the construction of the storage chamber 8 may be fully understood. The U-shaped entrance 7 extends rearwardly of the windows 17 and opens into the storage chamber 8, see Fig. 10.

The storage chamber 8 includes a rear wall 30 which is positioned rearwardly of the entrance 7 and curves downwardly and forwardly under the seat and indeed under the entire passenger compartment 2. The other wall 31 establishes the front of the entrance 7 and is curved to lie adjacent to the body 1 substantially at the rear edges of the windows 17. In order to accommodate the sides 11 of the top, the entire storage chamber 8 must be U-shaped in cross section. In Fig. 10, I have shown a flange 31ᵃ defining the top upper wall of the portions of the chamber 8 which receive the sides 11. I have shown in Fig. 10 a flanged wall 32 carried by the rear and bottom wall 30 which is adapted to detachably receive and support the flange 31ᵃ. It will be seen that the side receiving portions of the chamber 8 are adjacent the sides of the body 1 and are on each side of the seat 5. So positioned, they do not interfere with the passengers and may be formed to serve as arm rests. It will be appreciated, however, that it is essential to eliminate the excessive sides utilized in the present day constructions and represented by the distance from the back of the top to the doors 4 as the portion of the chamber 8 to accommodate the sides would be too high.

The floor wall 33 extends forwardly above the bottom wall 30 and in the front end of the chamber 8 I insert a roller 34 carrying a gear in mesh with a gear 34ᵃ adapted to be rotated by any means (not shown) preferably controlled from within the passenger compartment 2 as indicated at 35.

A second roller 36 is mounted on the wall 30 adjacent the chamber entrance 7 and on the rear of the wall 30 are supporting rollers 37. At 38 I have shown a compartment adapted to protect the belt 39 which extends through the chamber 8 over the rollers 34, 36, and 37 and through the compartment 30. As will presently be more fully described, the belt or conveyor 39 is secured to the rear edge of the center panel 10 of the top.

The chamber 8 is of sufficient length to receive the top with its rear edge in the forward portion thereof, while the bottom wall 13 of the head 12 of the top is adapted to lie substantially flush with the adjacent body portions as a partial closure for the storage chamber entrance 7.

The bottom edges of the panel 10 and the side 11 are provided with channels 40 and 41 respectively (see Figs. 15 and 16) and in order that these channels do not interfere with each other during movement of the side 11 relative to the center panel 10, the sides 11 are formed to extend slightly below the bottom edge of the panel 10.

The rear edge of the entrance 7 is formed to present a downturned flange 42 adapted to receive the channels 40 and 41 when the top is raised. As shown in Fig. 16, the flange 42 extends downwardly as required by the position of the channels 41 and carries a block 43 of a suitable resilient material, such as rubber, adapted to seal the space between the two channels 40 and 41 which may be provided with a rubber or like sealing strip 44.

The flange 42 is provided with a pair of guiding rollers 45 for the ribs 19b while the wall 31 is formed with a flange 31b which carries a roller 46 to guide the rib 19.

Adjacent the bottom edge and the channel 40 of the center panel 10 are legs 47 carrying rollers 48 adapted to enter the tracks 49 which are shaped to define channels along the rear partition or wall 30 to keep the rear edge of the top adjacent the wall 30 at all times. The interior of the panel 10 is recessed to receive the spring steel supporting plate 50 which carries at its rear end rollers 51 adapted to enter the track 49. In assembly I position one end of the belt 39 between the spring member 50 and the panel 10, and on the other side of the member 50 I place the other end of the belt 39 and lock the belt 39 and spring 50 in place by screws 52 (see Fig. 15). To facilitate this assembly the forward part of the track is formed without the retaining flange as at 49a.

On each side of the tracks 49 are tracks 53 into which the rollers 51 carried by slightly upturned arms 55 (see Fig. 4) extending rearwardly from the bottoms of the side panels 11. The tracks 53 are shaped to guide the rear ends of the side panels 11 relative to the central panel 10 as the top is raised and lowered, so that the width of the top may be varied for use or storage. The actual width of the chamber 8 is important in determining the disposition of the tracks 53.

It will be noted that the wall 13 of the top when the top is stored does not cover the whole of the entrance 7. In Fig. 9, I have shown how complete closure of the entrance 7 may be effected. For example, the box 6 may include as shown the wall 31 as its rear wall. I have provided at 60 a cover hinged as at 61 to the wall 31. At 62, I have shown auxiliary covers which are hinged as at 63 to the main cover 60, and are also hinged as at 64 to the back portion 65, the hinges 61 and 64 being in alignment permitting the cover 60 to be raised along that hinge line when the top is down. When the top is to be raised, the auxiliary covers 62 are folded inwardly out of the way. In order to close the space between the top and the wall 31 and to cover exposed portions of the box 6 when the top is raised, I provide slides 66 which may be positioned by movement of the knobs 67.

In Fig. 13, I have shown a modification of my top construction, which permits the use of insulation 70 which may in the case of the sides 11 be secured in conventional manner. In this embodiment, an inner top panel 10a is connected to the spring steel members 21 by the bar 20 while the panel 10 is secured to the panel 10a as by screws holding the ribs 19 and 19b in place. The members 10 and 10a are provided with a plurality of inwardly disposed ribs 71 adapted to hold the insulating material 70 in position.

In Figs. 12 and 14, I have shown a further modification of the top construction. In this form, bars indicated as at 80 are used to define the edges of the top and side panels which bars are interconnected by ribs 81 over which any suitable fabric 82 may be drawn in conventional manner.

In Fig. 10, I have shown auxiliary structures to lock the top in place when it is erected. Such structure may include pins 83 slidably mounted on the under surface of the flange 31a and under the influence of springs 84 urging the pins 10 into recesses indicated as at 85. An operator control is indicated by the flexible cable 86.

By the construction described, it will be appreciated that the passenger compartment 2 is removable so that installation and inspection of the top is facilitated.

It will also be noted that I have eliminated the necessity of posts adapted to cooperate with the door window 16 in closing the passenger compartment as the window 17 due to its arm 17a pivotally mounted as at 17b rests forwardly of its recess. The window 17 may be raised by any conventional means (not shown) and it is to be noted that the window 17 may be raised or lowered regardless of the position of the top.

As an alternative construction, and one that requires a departure from the present body style, the doors 4 may be formed so that their windows slide downwardly and forwardly along straight or curved lines parallel to the doors.

A top constructed in accordance with my invention makes possible the combination in one automobile of all the advantages of both open and closed types.

In operation, it may be assumed that the top is stored within the chamber 8. Before raising the tops by means of the control 35, the auxiliary covers 62 are folded inwardly. The control then is actuated and as by means of a motor (not shown) the belt 39 is moved to carry the rear edge of the top from the front of the storage chamber 8 to the rear thereof. Due to the spring plate 50, the front end of the top does not fall in place on the windshield 3, but is manually pulled in place and then locked in position. The control for the flexible cable 86 is then released so that the pins 83 move into position under the sides 11 to cooperate in holding the top in position and the slides 66 are moved into desired position.

When it is desired to lower the top, the control for the cable 86 is actuated to draw the pins 83 from top holding position, the slides 66 are moved inwardly, and the control 35 actuated to draw the top within the chamber 8. The spring plate 50 cooperates in lifting the front end of the top so that no manual assistance is required. When the top is stored with the front end thereof establishing a partial entrance closure, the auxiliary covers are unfolded to complete the closure of the entrance 7.

It will be appreciated that for purposes of simplification, I have not attempted to discuss all possible modifications in structure, many of which will be dependent on particular requirements of the manufacturer or on the type of body with which my invention is to be used. For those reasons, I have not shown or described the driving means for the belt 39.

What I therefore claim and desire to secure by Letters Patent is:

1. In combination with a vehicle body having a passenger compartment, a storage chamber under said compartment and having an entrance rearwardly thereof, the front portion of said chamber being of less width than said entrance, a top adapted to cover said compartment and to be stored in said chamber, said top comprising a center member, and side members, the front portions of said members being pivotally connected to permit said side members to be laterally pivoted to vary the width of said top, means in said body supporting the rear portion of said center member in said chamber and being adapted to raise said top with its rear edge adjacent said entrance and to lower said top with its rear edge in the front portion of said chamber, and guide means in said chamber to effect a pivoting of said side members to adjust the width of said top as required for use and storage as said first-named means carries said rear edge in either direction.

2. In a vehicle body having a passenger compartment, a storage chamber under said compartment and having an entrance rearwardly thereof, the front portion of said chamber being of less width than said entrance, a top adapted to cover said compartment and to be stored in said chamber, said top comprising a center member, and side members, the front portions of said members being pivotally connected to permit said side members to be laterally pivoted to vary the width of said top, means in said body supporting the rear portion of said center member in said chamber and being adapted to raise said top with its rear edge adjacent said entrance and to lower said top with its rear edge in the front portion of said chamber, guide means in said chamber to effect a pivoting of said side members to adjust the width of said top as required for use and storage as said first-named means carries said rear edge in either direction, and sealing means interlocking said top members during the lateral pivoting of said side members caused by said second-named means.

3. In combination with a vehicle body having a passenger compartment, a storage chamber under said compartment and having an entrance rearwardly thereof, the front portion of said chamber being of less width than said entrance, a top adapted to cover said compartment and to be stored in said chamber, said top comprising a center member, and side members, the front portions of said members being pivotally connected to permit said side members to be laterally pivoted to vary the width of said top, means in said body supporting the rear portion of said center member in said chamber and being adapted to raise said top with its rear edge adjacent said entrance and to lower said top with its rear edge in the front portion of said chamber, guide means in said chamber to effect a pivoting of said side members to adjust the width of said top as required for use and storage as said first-named means carries said rear edge in either direction and an operator controlled lock in said chamber to support said top when positioned to cover said compartment.

4. In combination with a vehicle body having a passenger compartment, a storage chamber having a rear wall under said compartment and having an entrance rearwardly thereof, the front portion of said chamber being of less width than said entrance, a top adapted to cover said compartment and to be stored in said chamber, said top comprising a center member, and side members, the front portions of said members being pivotally connected to permit said side members to be laterally pivoted to vary the width of said top, means in said body supporting the rear portion of said center member in said chamber and being adapted to raise said top with its rear edge adjacent said entrance and to lower said top with its rear edge in the front portion of said chamber, guide means in said chamber to effect a pivoting of said side members to adjust the width of said top as required for use and storage as said first-named means carries said rear edge in either direction and means to hold said center member in desired relation to said wall during actuation of said first-named means.

5. In combination with a vehicle body having a passenger compartment, a storage chamber having a rear wall under said compartment and having an entrance rearwardly thereof, the front portion of said chamber being of less width than said entrance, a top adapted to cover said compartment and to be stored in said chamber, said top comprising a center member, and side members, the front portions of said members being pivotally connected to permit said side members to be laterally pivoted to vary the width of said top, means in said body supporting the rear portion of said center member in said chamber and being adapted to raise said top with its rear edge adjacent said entrance and to lower said top with its rear edge in the front portion of said chamber, guide means in said chamber to effect a pivoting of said side members to adjust the width of said top as required for use and storage as said first-named means carries said rear edge in either direction and means adapted to place said top under a supporting tension when said top is in use, said tensioning means including a plate of spring metal and means to hold said center member and said plate in desired relation to said wall during actuation of said first-named means.

6. The combination of a vehicle body having a passenger compartment, a storage chamber under said compartment and having an entrance rearwardly thereof, the front portion of said chamber being of less width than said entrance and a top adapted to cover said compartment and to be stored in said chamber, said top comprising a center member, and side members, the front portions of said members being pivotally connected to permit said side members to be laterally pivoted to vary the width of said top, means in said body supporting the rear portion of said center member in said chamber and being adapted to raise said top with its rear edge adjacent said entrance and to lower said top with its rear edge in the front portion of said chamber and guide means in said chamber to effect a pivoting of said side members to adjust the width of said top as required for use and storage as said first-named means carries said rear edge in either direction, means to seal said entrance when said top is in use, said last named means including flanges carried by said top member to permit said pivoting of said side members and flanges carried by said body adjacent the rear edge of said entrance to be engaged by said first-named flanges, and said guide means being adapted to place said flanges on said side members in position for engagement with said other flanges.

7. The combination of claim 2 in which the sealing means comprise interlocking flanges of spring metal on said top members disposed in mutual contact during lateral pivoting of said side members for use and storage.

8. The combination of claim 2 in which the sealing means comprise interlocking flanges of spring metal on said members disposed in mutual contact, each of said flanges being tapered and extending substantially the length of said members and being of maximum width at its rear end.

9. The combination of claim 1 in which each of the top members is rigid and of metal.

10. The combination of claim 1 in which each of the top members includes a rigid metal frame and a fabric cover for said frame.

11. In combination with a vehicle body having a passenger compartment having a storage box in the rear thereof, a storage chamber under said compartment and having a U-shaped entrance rearwardly thereof, a top to cover said compartment and to be stored in said chamber, said top being U-shaped in cross section and the front of said top being of less width than said entrance and being adapted to effect a closure of the middle portion of said entrance when said top is stored in said chamber, a hinged cover for said box, a pair of metal plates hinged to said cover and adapted to be unfolded to cooperate with the front of said top in closing said entrance and to be folded within said compartment when said top is raised and a pair of members slidably carried by said cover and adapted to be positioned to contact the sides of said top when said top is raised.

12. In combination with a vehicle body having a passenger compartment having a storage box in the rear thereof, a storage chamber under said compartment and having a U-shaped entrance rearwardly thereof, a top to cover said compartment and to be stored in said chamber, said top being U-shaped in cross section and the front of said top being of less width than said entrance and being adapted to effect a closure of the middle portion of said entrance when said top is stored in said chamber, a hinged cover for said box, a pair of metal plates hinged to said cover and adapted to be unfolded to cooperate with the front of said top in closing said entrance and to be folded within said compartment when said top is raised and a pair of members slidably carried by said cover and adapted to be positioned to contact the sides of said top when said top is raised, each of said plates including an end portion and a hinge connecting said portion to said plate to permit said cover to be raised when said plates are unfolded.

HARRY A. GOALWIN.